Patented July 20, 1943

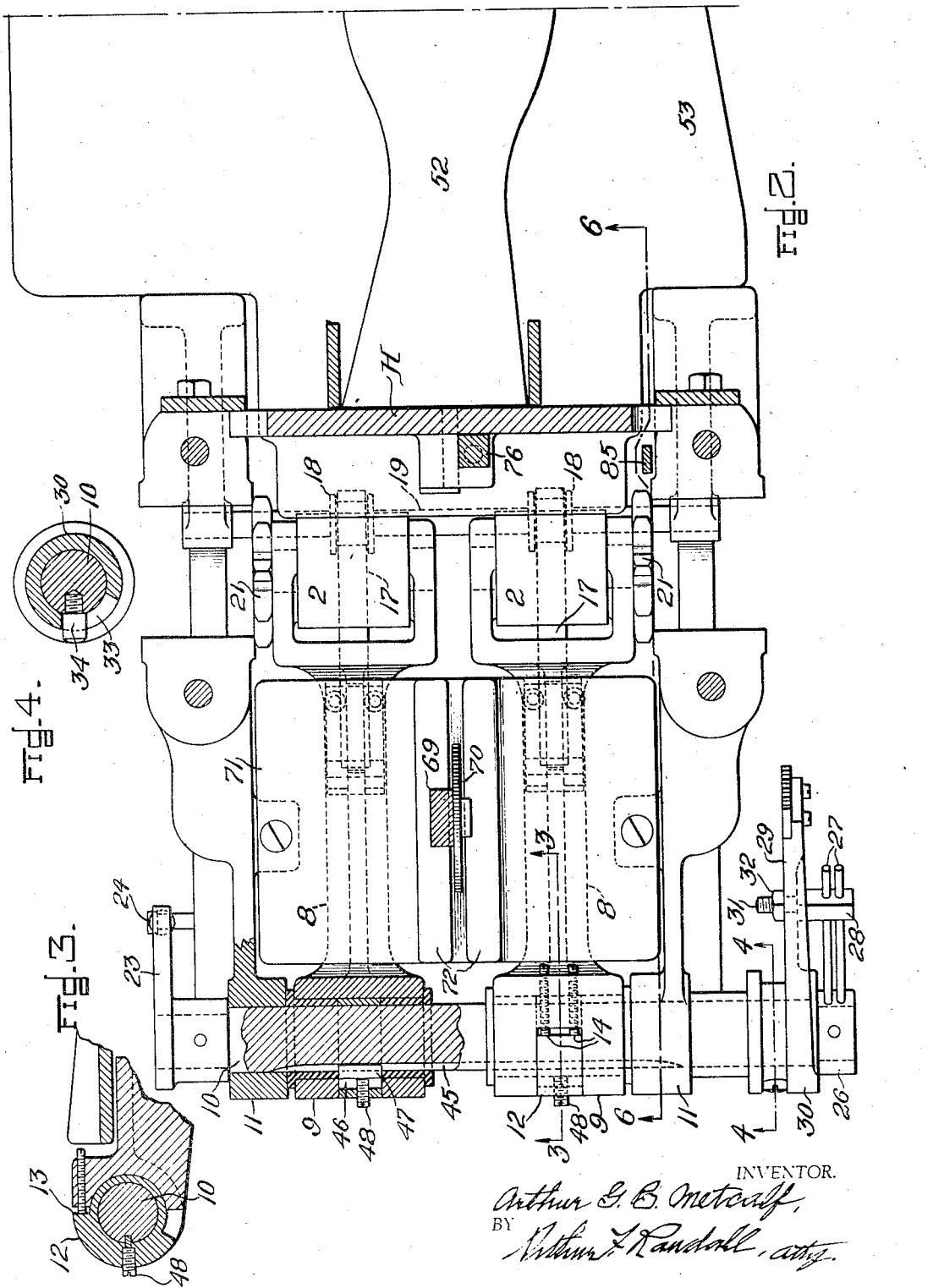

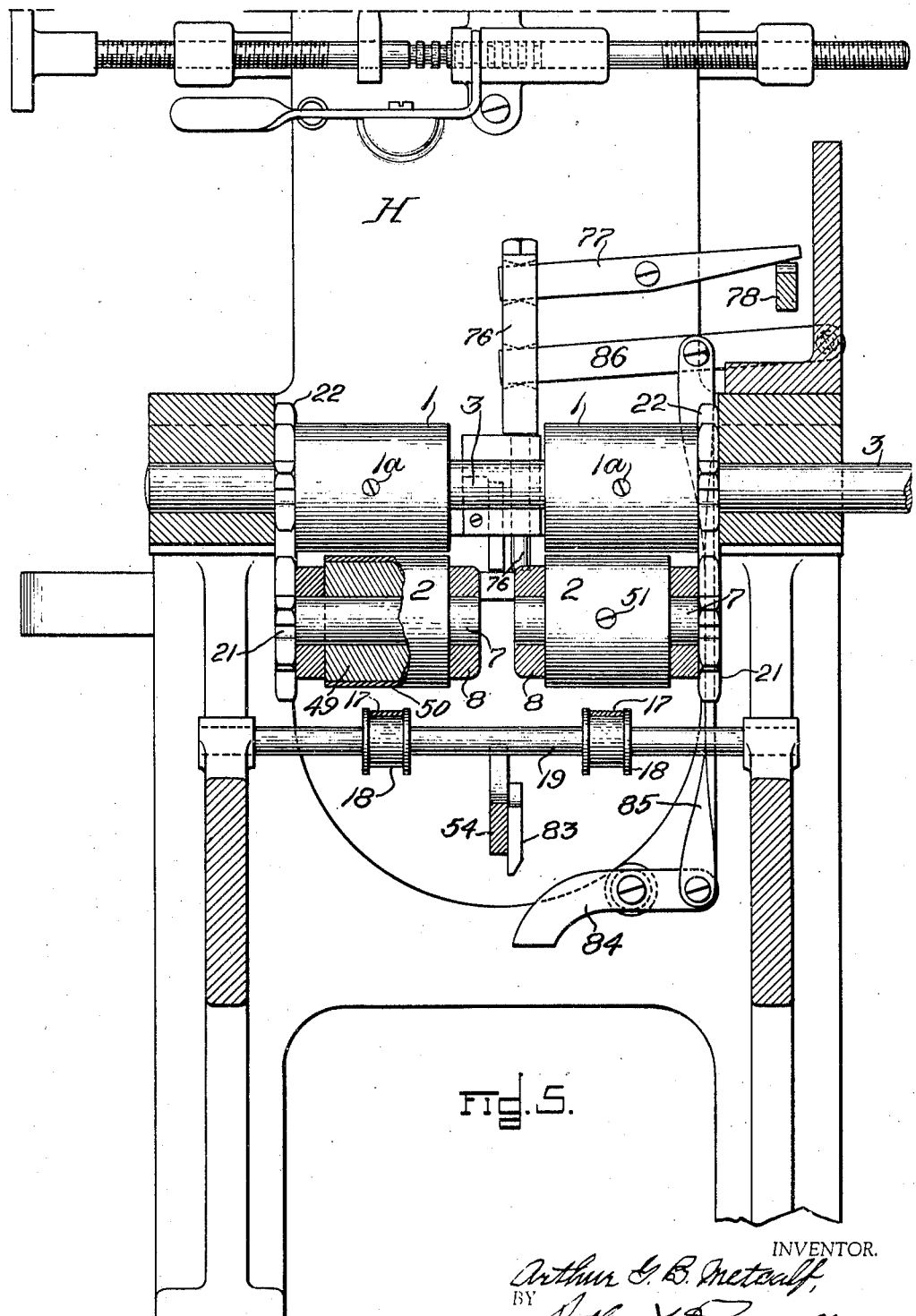

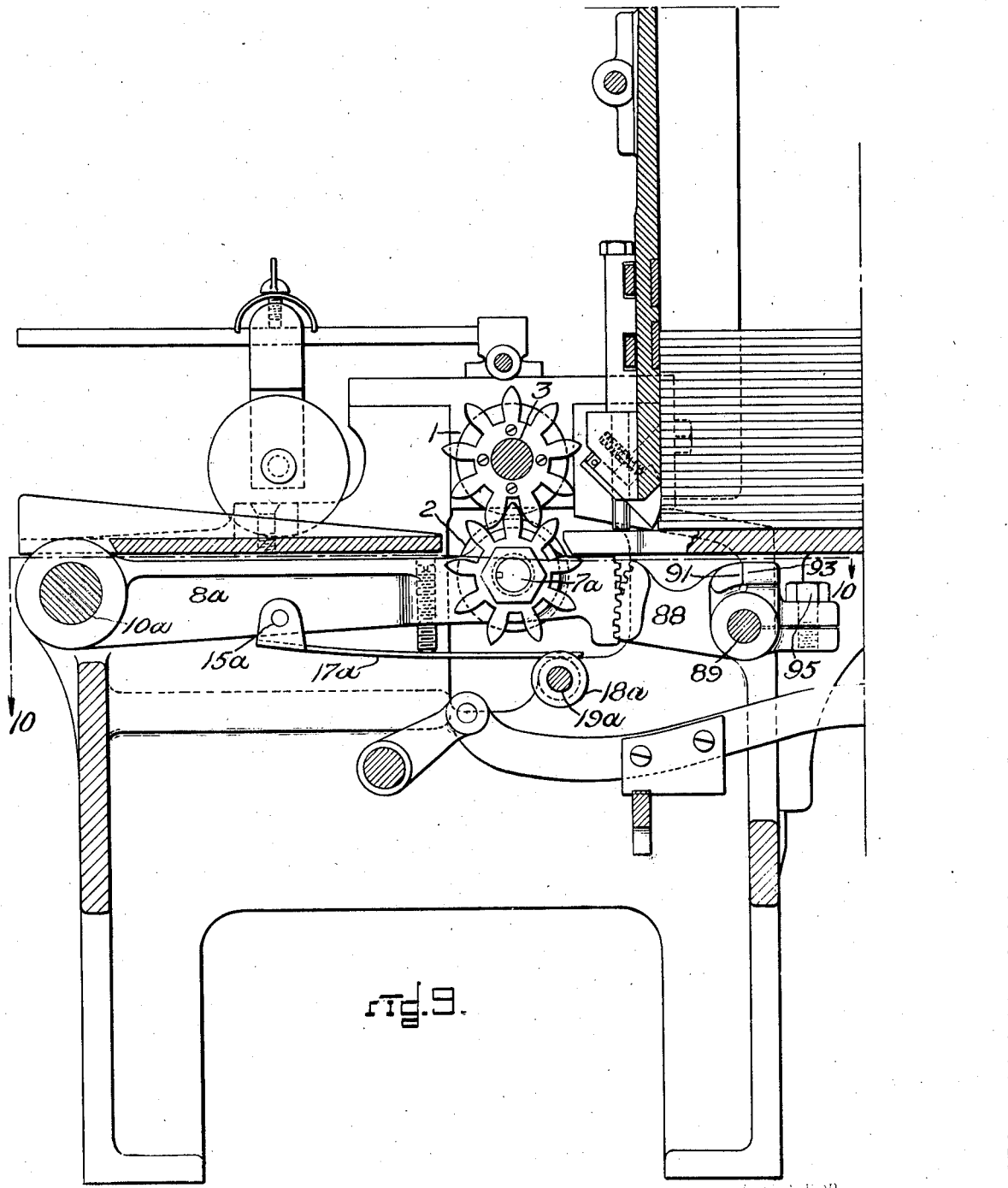

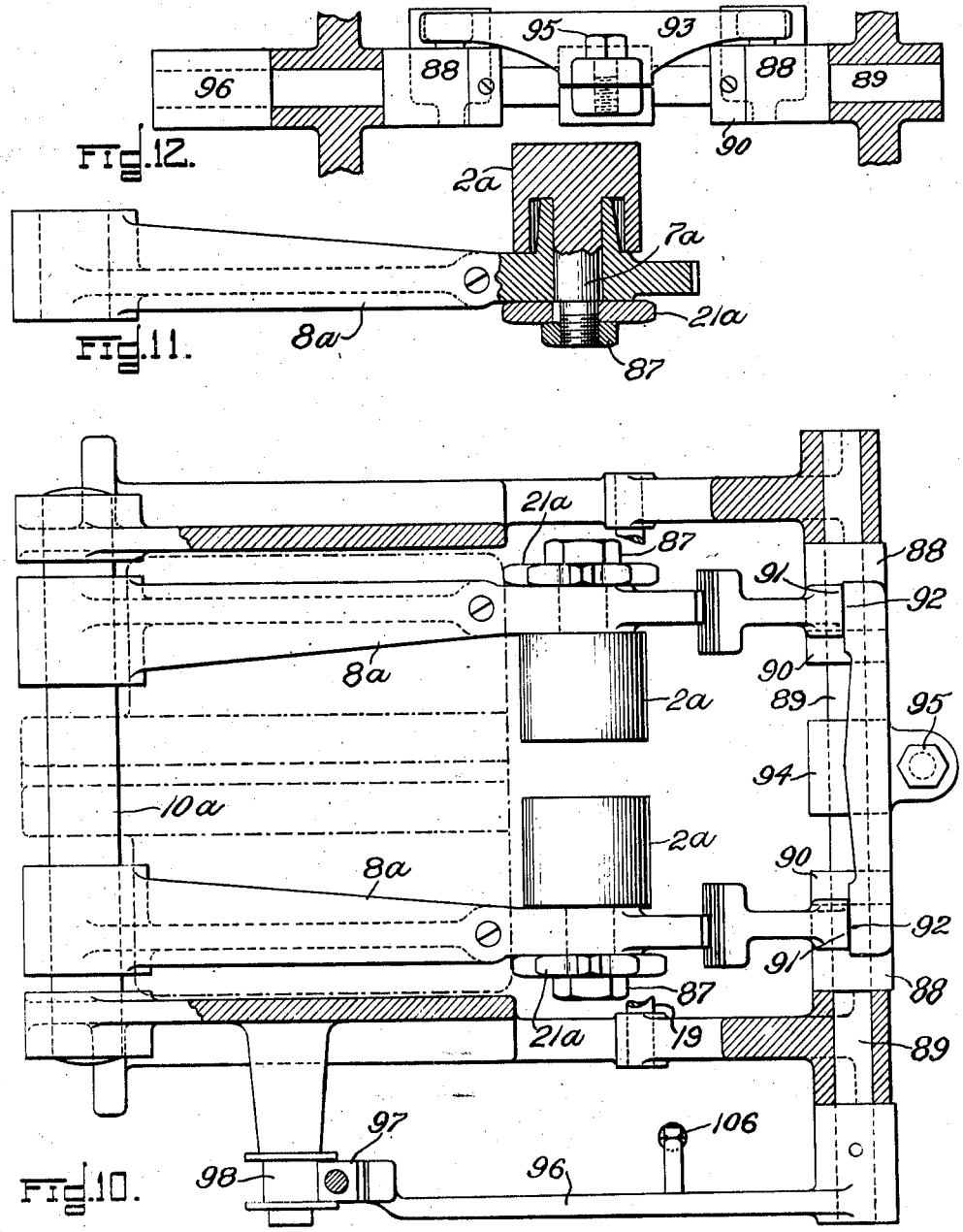

2,325,011

UNITED STATES PATENT OFFICE 2,325,011

GRADING MACHINE

Arthur G. B. Metcalf, Milton, Mass., assignor to North American Holding Corporation, Syracuse, N. Y., a corporation of New York Application November 14, 1941, Serial No. 419,057

12 Claims. (Cl. 33—148)

This invention relates to grading machines of that class which grade died-out pieces of leather such as cut soles, taps, heel lifts, counters and other blanks, in accordance with the thickness of the thinnest part thereof as detected by the blank-measuring mechanism of the machine, the primary object of the invention being to improve the construction and operation of machines of this class, particularly with respect to the blank-measuring or calipering mechanism and the motion-transmitting devices through which the blank-measuring or calipering mechanism controls and operates the adjustable grading mechanism of the machine.

The term grading machine is established in this art as a generic term, and includes devices for stamping or marking each blank with its grade-indicating character; evening or skiving the blank, either in whole or in part, down to the grade thickness of its thinnest part or spot; indicating on a visual indicator the grades of the different blanks as they pass through the machine, and also sorting or distributing the blanks to segregate the different grades.

Examples of some of the types just referred to are found in U. S. patent to Coggswell, No. 1,686,487 granted October 2, 1928 wherein the grading mechanism comprises a visual indicator; in U. S. patent to Coggswell, No. 1,726,610 granted September 3, 1929 wherein the grading mechanism comprises evening or skiving devices, and in U. S. patent to Coggswell, No. 1,741,149 granted December 31, 1929 wherein the grading mechanism comprises sorting or distributing devices.

In the machines of these patents the blank-measuring mechanism comprises upper and lower blank-calipering rolls between which the blanks are passed one at a time, the shaft of the upper roll being mounted in fixed bearings and the lower roll being yieldingly supported so that it is movable toward and from the upper roll in a substantially vertical plane under the influence of variations in the thickness of the blank as the latter passes between the rolls. The lower roll is connected with the grading mechanism by a train or system of motion-transmitting and amplifying elements through which said lower roll acts to set or adjust the grading mechanism in accordance with the thickness of the thinnest spot or portion of the blank that is detected by the calipering rolls. Usually the setting of the grading mechanism as effected by the calipering rolls accorded with a thickness, as measured in irons or fraction thereof, that is nearest to but not greater than the thickness of the thinnest spot, an iron being equal to one forty-eighth of an inch.

The usual means by which the lower roll was yieldingly supported was comparatively massive, heavy and complicated which tended toward sluggishness in its action, while the motion-transmitting and amplifying devices by which the displacement of the lower calipering roll was communicated to the grading mechanism included connecting rods, links, crank arms, levers, radius rods and the like, which introduced inaccuracy termed "cosine error," the latter being defined briefly as that disproportionate or inaccurate transmission of motion which results from the use of such devices, necessarily of finite length, in a mechanical linkage or gearing for converting rectilinear motion into curvilinear motion, or vice versa. Also, the inertia of the parts heretofore employed was a factor which interfered with the sensitivity of the measuring devices thus restricting the speed of operation of the machine and tending to render the mechanism inaccurate.

It is an object of the invention to provide improved motion-transmitting and amplifying means through which the blank-calipering devices will act accurately and promptly to adjust the grading mechanism of a machine of the class described, and it is a feature of this invention that as a factor contributing to this end the motion-transmitting means is preferably, though not essentially, constructed mainly of very light material such as aluminum, duralumin or the like, so that its inertia is reduced to a minimum and as a result it will quickly respond to the influence of the calipering mechanism.

It is another object of the invention to provide improved motion-transmitting and amplifying means consisting of a train or system of elements whereof each is so constructed that it is devoid of the cosine error referred to above.

A further object of the invention is to provide improved means for causing the calipering rolls to yieldingly engage each blank as the latter passes between them.

With the above and other objects in view I have provided certain improvements in grading machines of the class described as set forth in the following description, the several novel features of the invention being separately pointed out and defined in the claims at the close of the description.

In the accompanying drawings:

Figure 2 is a section on line 2—2 of Fig. 1, but with some of the parts removed.

Figure 3 is a section on line 3—3 of Fig. 2.

Figure 4 is a section on line 4—4 of Fig. 2.

Figure 5 is a section on line 5—5 of Figs. 1 and 6.

Figure 9 is a central longitudinal sectional view of the machine shown in Fig. 8.

Figure 10 is a section on line 10—10 of Fig. 9.

Figure 11 is a plan view, partly in section, of one of the roll-carrying levers hereinafter described.

Figure 12 is an elevation, partly in section, of the portion of the motion-transmitting mechanism shown in Fig. 10 as viewed from the right in Figs. 8 and 9.

Figure 1:
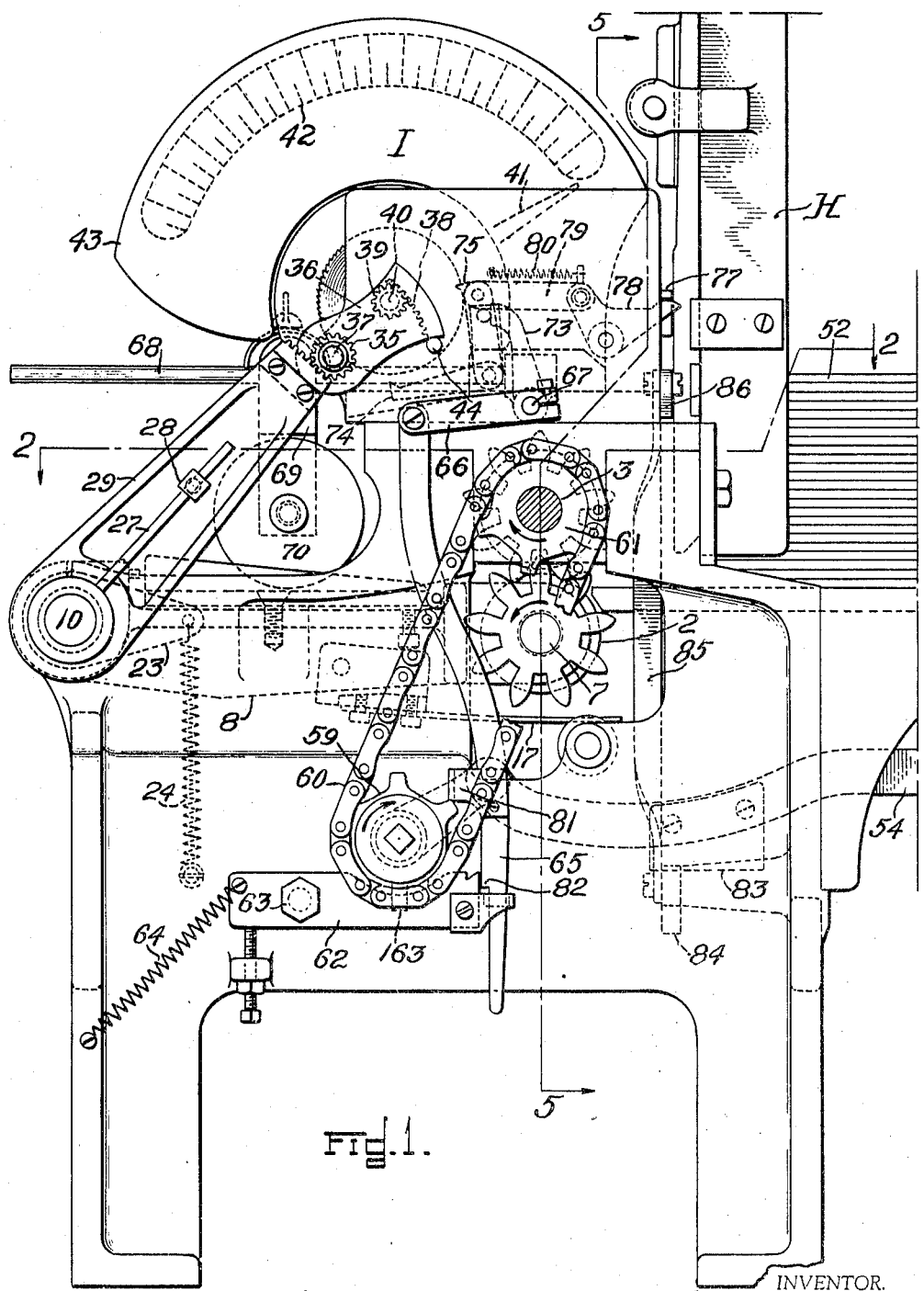
Figure 1 is a side elevation of a grading machine constructed in accordance with my invention.

The calipering devices of the embodiment of my invention illustrated in Figs. 1 to 7, inclusive, include an upper calipering roll element consisting of a pair of roll sections 1, 1, fastened by set screws 1a upon the main continuously driven shaft 3 of the machine, and two independently and yieldingly supported lower calipering rolls 2, 2, each co-operatively associated with one of the upper roll sections 1.

The blanks 52 to be graded are stacked within a magazine or hopper H provided adjacent to its bottom with an outlet that is controlled by the usual vertically movable gate 76 (Fig. 6) past which the blanks are fed one at a time from the bottom of the hopper to the nip of the calipering rolls, which are continuously rotated in the directions of the arrows to propel each blank toward the outlet end of the machine. The measuring or calipering action of the machine is started automatically when the forward end of the blank moves under and lifts a drop roll 70 and is stopped automatically when the gate 76 drops off from the rear end of the blank. During this calipering interval the pointer 41 (Fig. 1) of the machine is automatically adjusted and set to indicate on dial bracket 43 the thickness of the thinnest spot of the blank as detected by the calipering devices. At the completion of the calipering action the blank is discharged from between the rolls 1 and 2 and comes to rest upon a shelf or bed plate 71 where it continues to support drop roll 70 in an elevated position until the measured blank is removed from the machine by the operator. The removal of the blank by the operator permits roll 70 to drop and act through the usual means automatically to occasion a single revolution of a crank arm 55 which latter acts through a link 54 and associated devices to first raise gate 76 and then, while the gate is thus momentarily elevated, to feed forward the next blank from hopper H. As soon as the forward end of this next blank has passed beyond gate 76 the latter is permitted to drop on to the top of the blank where it remains partially elevated until it falls off from the rear end of the latter to stop the calipering action of the machine so far as that blank is concerned and to lock the pointer 41 in its adjusted position. The pointer 41 remains thus locked in adjusted position until the gate is again raised for another blank. This principle of operation is as heretofore.

Shaft 3 carries a worm wheel 4 (Fig. 7) which is continuously driven, as usual, by a worm 5 fast on the armature shaft 6 of an electric motor (not shown).

In accordance with the present invention each lower roll 2 is fast on a short shaft 7 journaled in bearings provided in the tines of a fork formed at one end of a horizontal lever arm 8, said roll being disposed between said tines. At its opposite end the lever arm 8 is made with a hub 9 (Fig. 2) pivotally mounted upon a rock shaft 10 journaled in bearings 11, 11, on the frame of the machine. Each hub 9 is forked or recessed to embrace and pocket a collar 12 that is splined on shaft 10 and made with a radial abutment shoulder 13 (Figs. 2 and 3) which co-operates with a pair of abutment screws 14 adjustably mounted in threaded holes provided in the upper part of hub 9. As shown in Fig. 3 these screws are tangentially disposed with respect to the axis of shaft 10 and perpendicularly with respect to the radial shoulder 13 when in engagement with the latter. This construction provides a one-way knuckle-joint connection between each lever arm 8 and shaft 10.

Pivotally mounted at 15 (Fig. 6) upon the depending web of each lever 8 intermediate the ends thereof, is a yoke 16 to the lower intermediate portion of which is rigidly fastened one end of a leaf spring 17 whose opposite end is supported by a flanged roller 18 that is loosely and rotatably mounted upon a transverse shaft 19. This shaft has its opposite ends supported by and fixed to the frame of the machine.

The springs 17 yieldingly support the levers 8 normally at the limit of their upward movement on shaft 10 with the knuckle-joint connection closed and with the two lower rolls 2, 2, at the limit of their movements toward the upper roll sections 1, 1.

The effective resistance of springs 17 to downward movement of the levers 8 may be adjusted or varied as desired by means of capstan abutment screws 20 mounted on the levers 8 in position to bear against the yokes 16.

The shaft 7 of each lower roll 2 (Fig. 5) also has fixed on it a finder-gear 21 that is always in mesh with, and driven by, a similar gear 22 that is compounded with the upper roll section 1 which co-operates with said roll 2. Thus, while the machine is in use, both the upper and the lower rolls are continuously driven from shaft 3 and act to propel the blanks one at a time through the machine.

Figure 6:
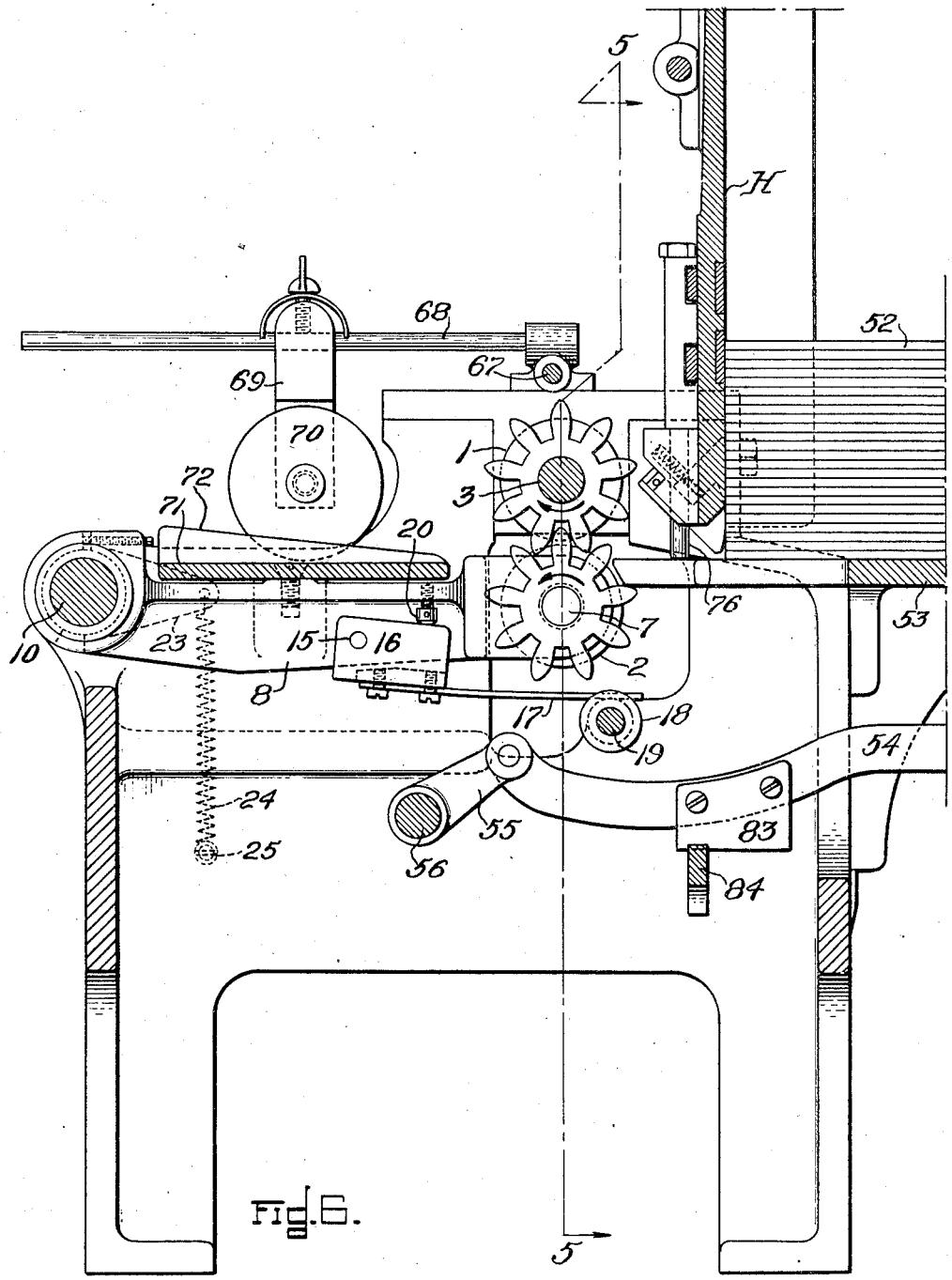
Figure 6 is a section on line 6—6 of Fig. 2.
Figure 7:
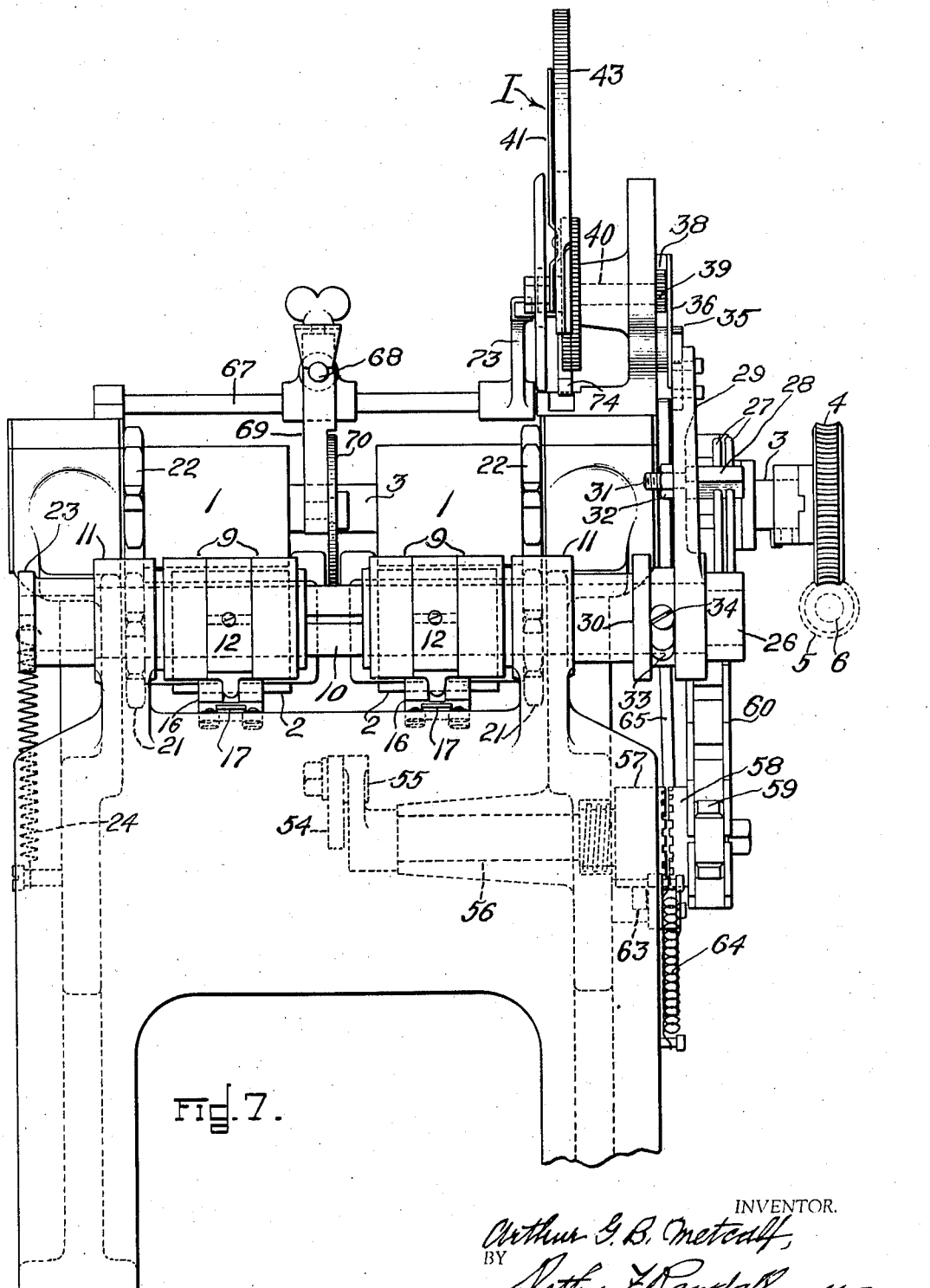
Figure 7 is an end elevation of the machine as viewed from the left in Fig. 1.

At one end thereof the shaft 10 has fixed on it a radial arm 23 (Fig. 2) to which one end of a spring 24 is connected, the opposite end of said spring being connected with the frame of the machine as indicated at 25 in Fig. 6. This spring 24 urges shaft 10 in a clockwise direction (Fig. 3) so as to normally hold the shoulders 13 of both collars 12 yieldingly against their abutment screws 14 but its strength is less than that of either spring 17 (Fig. 6) so that the movement of shaft 10 under the influence of spring 24 is limited by the engagement of one, or both of the shoulders 13 with abutment screws 14.

At its opposite end the shaft 10 has fixed on it a hub or collar 26 (Figs. 1 and 2) made with a pair of radial spring arms 27 which extend loosely through apertures or holes provided in a post 28 projecting laterally from a gear sector lever arm 29 that is made with a hub 30 loosely mounted on shaft 10. The post 28 is made at one end with a stem 31 swivelly mounted within an aperture provided in arm 29 and held in position therein by a nut 32 mounted upon the outer threaded end portion of said stem. The hub 30 is made with a circumferential slot 33 (Fig. 4) that is occupied by a pin or stud 34 projecting radially from shaft 10.

At its upper free end the gear sector lever-arm 29 is provided with an arcuate rack of teeth meshing with the teeth of a small gear or pinion 35 which is the hub of a small gear sector lever 36 (Figs. 1 and 7), said small gear or pinion being rotatably supported by a pivot stud 37 projecting from the frame of the machine. In addition to the pinion 35 the lever 36 is made at its free end with an internal arcuate rack of gear teeth 38 meshing with a pinion 39 fast on the outer end of the usual shaft 40 of an indicator mechanism I. This indicator mechanism I is constructed and operates as heretofore and includes the pointer 41 which is fast on the inner end of shaft 40, said pointer being adapted to co-operate with the usual scale 42 provided upon the front face of the usual dial bracket 43.

The upward movements of the lever arms 8 under the influence of the springs 17 (Fig. 6) are limited by their engagement with a bed plate 71 that is part of the frame of the machine.

As shown in Fig. 2 of the drawings, the shaft 40 is made with a longitudinal key-way 46 and each abutment collar 42 is made upon its interior with a key-way 46 within which is disposed a key 47 which projects into key-way 46 of shaft 40 thus locking the collar and shaft against rotative displacement relatively. Each key 47 is held in locking position by an adjustable screw 48 and when this screw is set up tight the key 47 then serves to clamp the collar 42 to shaft 40 so that it holds lever 8 against longitudinal displacement on shaft 40. When screws 48 are loosened the lever arms 8 and their rolls 2, 2, can be adjusted toward or from each other so that the rolls may be set in positions relatively to the medial line of the machine (as viewed in plan) which are appropriate to the size of the blanks being graded and to the width of the narrowest part thereof. In other words, the construction described provides for setting the lever arms 8 so that their rolls 2, 2 will remain in engagement with each blank throughout the length of the latter. It will be clear that the upper roll sections 4, 4 may be positioned on their shaft 3 so that each is opposite one of the lower rolls 2 with its gear 22 in mesh with the gear 21 of the lower roll.

As shown in Fig. 5, each lower roll 2 may consist in most part of a cylindrical core or body 49 of aluminum or the like on to which is forced a thin cylindrical jacket 50 of steel or other suitable wear-resisting material. A set screw 51 secures each roll 2 to its shaft 7. Also, the roll-carrying arms 8 and the gear sector lever-arm 29 are preferably made from aluminum or the like so as to reduce their inertia to a minimum.

The stack of blanks 52 to be graded is supported by the bottom wall 53 of the hopper or magazine H on which they are automatically slid forward into the bite of rolls 1 and 2 one at a time by the feed mechanism.

The feed mechanism, constructed as usual, comprises a feed slide, not shown, mounted in longitudinal ways provided on bottom wall 53 and this slide is connected by link 54 with the crank arm 55 that is fast on the inner end of a short transverse shaft 56 journaled in a bearing provided on one of the side walls of the frame of the machine. Shaft 56 is normally at rest and has splined upon its outer end portion the usual clutch member 57 (Fig. 7) co-operating with a complementary clutch member 58 loosely mounted upon the outer extremity of shaft 56 but held against longitudinal displacement thereon.

Clutch member 58 is the hub of a sprocket 59 which is connected by a chain 60 with a sprocket 61 fast on the continuously driven main shaft 3. Sprocket 59 is thus continuously rotating in the direction indicated while the usual pivotally supported shipper member 62 normally engages a radial stud 63 on clutch member 57 to hold the latter out of engagement with the continuously rotating clutch member 58.

Shipper member 62 is pivotally mounted at 63 on the frame of the machine (Fig. 1) and is yieldingly urged toward clutch member 57 by a spring 64. The free end of shipper member 62 is co-operatively associated, as usual, with the lower end of a push rod 65 whose upper end is pivotally connected with an arm 66 fast on a transverse rock-shaft 67 provided adjacent to its middle with a horizontal longitudinally disposed trip arm 68 on which is adjustably mounted a depending bracket 69 provided at its lower end with the drop roll 70 normally resting by gravity upon a bed plate 71 forming part of the frame of the machine.

Roll 70 occupies a position within a slot between and defined by a pair of inclines 72 (Figs. 2 and 6) so that as the forward end of a blank emerges from between the rolls 1 and 2 it slides up the inclines and raises roll 70 and arm 68, thereby rocking shaft 67 and arm 66 in a direction to raise push-rod 65. This upward movement of the push-rod lifts a shoulder 82 adjacent to the lower end thereof (Fig. 1) into position above the free end of shipper member 62 where it remains until the operator removes the graded blank from the machine.

At the same time that the push-rod 65 is thus lifted, an arm 73 fast on rock-shaft 67 is swung toward the right (Fig. 1) thereby permitting the usual "start grading" pawl 74 to be thrown into action by its spring (not shown) to start the blank-calipering operation during which the usual "stop grading" pawl 75 is held out of action by the hopper gate 76 (Fig. 5) acting through lever 77, bell-crank 78 and link 79 as in machines of this type as heretofore constructed.

During the blank-calipering operation the pointer 41 (Fig. 1) responds only to a reduction in the thickness of the blank as the rolls 1 and 2 traverse the latter and is uninfluenced by any increase in thickness because said pointer is held against movement toward the left by the start-grading pawl 74. For the same reason the gear sector lever-arm 29 and gear sector lever 36 remain undisturbed by spring 24 even though the increase in thickness depresses both lever-arms 8 sufficiently to open both knuckle joints connecting said lever-arms with shaft 40. It is to be noted that under these circumstances the spring arms 27 rigidly oppose rotative displacement of shaft 40 by spring 24, the latter yieldingly maintaining the stud 34 (Fig. 4) stationary within slot 33 in the hub 30 of gear sector arm 29.

During the blank-calipering interval the hopper gate 76 is supported in an elevated position by the blank and thereby maintains the stop-grading pawl 75 out of action thus permitting the pointer 41 to respond to a decrease in the thickness of the portion of the blank being calipered. When the rear end of the blank passes the hopper gate the latter falls and acts through the connections described to permit a spring 80 (Fig. 1) to throw the stop-grading pawl into action which, as usual, locks the pointer 41 against angular displacement in either direction for the reason that both pawls of the indicator mechanism are now in locking engagement with their ratchet wheels.

Removal of the graded blank from the machine leaves the pointer 41 momentarily locked in its adjusted position, against the pressure of springs 17, by stop-grading pawl 75, but such removal permits the arm 68 to fall by gravity and the accompanying downward movement of push-rod 65 causes the shoulder 82 to swing shipper member 62 downwardly out of engagement with stud 63. This permits clutch member 57 (Fig. 7) to be spring pressed into engagement with clutch member 58 whereupon crank arm 55 makes one revolution and stops. As the crank arm is nearing the end of the revolution just referred to the stud 63 engages an arm 81 on push-rod 65 and disengages shoulder 82 from shipper member 62 which is swung upwardly by its spring into the path of the approaching stud 63 through which latter it then acts to disengage clutch member 57 (Fig. 7) from the continuously rotating clutch member 58 thereby stopping crank arm 55.

Near the start of the revolution of crank arm 55 a cam 83 (Figs. 1 and 5) provided on link 54 acts through a lever 84, link 85 and a lever 86, to raise gate 76 as the forward end of the next blank is fed into position beneath it and into the bite of rolls 1 and 2 whereupon cam 83 drops the gate on to the top of said next blank by which it is held elevated during the calipering operation which starts when the forward end of the blank raises drop roll 68 and ends when the gate drops off the rear end of the blank. When the gate is raised as described it acts through the connections described to throw the stop-grading pawl 75 out of action which permits the pointer 41 to be returned to zero position by springs 17 acting through lever-arms 8, collars 12, shaft 10, spring arms 27, gear sector 29, gear sector lever 36, and shaft 40. The spring arms 27 cushion the shock of the return of the parts to their normal positions and also permit the lever-arms 8 to follow variations in the thickness of the blank after the indicator has been locked and until the blank is discharged from between the rolls 1 and 2.

It will be observed that rotative displacement of indicator pinion 39 (Fig. 1) occasioned by angular movement of gear sector lever 36 on the stud 37 will be exactly proportional to the movement of said lever but of greater magnitude; that the angular movement of gear sector lever 36 occasioned by angular movement of gear sector lever arm 29 will be exactly proportional to the movement of said lever arm but of greater magnitude, and that the angular displacement of gear sector lever arm 29 will exactly equal the angular downward displacement of that roll-carrying lever arm 8 which detected the thinnest spot of the blank during the calipering operation.

In the embodiment of my invention illustrated in Figs. 8 to 12, inclusive, the main shaft 3 has adjustably mounted upon it a pair of upper calipering roll sections 1 like those above described, and below each upper roll section is arranged a lower calipering roll 2a (Figs. 9 and 10) rotatably and independently supported by a gear sector lever 8a of the third order loosely fulcrumed on a shaft 10a that is fixed at its opposite ends within sockets provided on the frame of the machine.

At an intermediate point adjacent to its free end each lever 8a is made with a transverse bearing (Fig. 11) for the shaft 7a of its roll 2a, said shaft preferably being an integral part of the roll. Each roll 2a is disposed upon the inner side of its lever 8a and its shaft extends through the lever to the outer side thereof where it is provided with a finder gear 21a which is keyed to said shaft and held in position thereon by a nut 87, said nut being screwed on to the threaded outer end of the shaft and serving to clamp the gear against a shoulder on the shaft so that the latter and its roll are free to rotate.

At its free end each lever 8a is made or provided with an arcuate rack of gear teeth which is concentric with the axis of fulcrum shaft 10a and meshes with an arcuate rack of gear teeth provided upon a gear sector abutment member 88 (Figs. 9 and 10) that is made with a hub loosely mounted upon a rock-shaft 89 journaled near its opposite ends in bearings on the frame of the machine. Collars 90 fixed in position on shaft 89 co-act with the frame of the machine in holding the members 88 against longitudinal displacement on shaft 89 in either direction.

Each abutment member 88 is made with a radial abutment shoulder 91 and these shoulders of the two members co-operate with radial abutment shoulders 92 provided at the opposite ends of a follower 93 made at its middle with a split hub 94 that is mounted upon rock-shaft 89 and rigidly fastened thereto by means of a clamping screw 95.

At its one end rock-shaft 89 projects beyond the frame of the machine and has fixed thereon the hub of a gear sector lever arm 96 (Figs. 8 and 10) provided at its free end with an arcuate rack of gear teeth meshing with the teeth of a straight rack of gear teeth provided on a rack member 97. This rack member occupies a position within the groove of a flanged roller 98 that is rotatably mounted upon the frame of the machine. Rack member 97 is made with a longitudinal bore within which is slidably mounted the lower end portion of a stem 99 whose upper end is rigidly fastened to a second rack member 100. This second rack member is made with a straight rack of gear teeth meshing with the teeth of the usual pinion 39a provided upon the outer end of the pointer-carrying shaft 40 of indicator I. A guide block 101 on the frame maintains the teeth of rack member 100 in mesh with the teeth of the pinion.

A coiled spring 102 mounted upon the stem 99 bears at its upper end against the upper rack member 100 and at its lower end against the lower rack member 97 thereby normally holding the latter yieldingly against a stop nut 103 mounted upon the lower threaded end portion of stem 99. A lock nut 104 secures the stop nut in adjusted position. Spring 102 is of sufficient strength to operate indicator I while the stop-grading pawl is out of action but yields to permit upward movement of lower rack member 97 on stem 99 while said pawl is in action.

Each gear sector lever 8a is yieldingly urged upwardly by a relatively stiff and strong leaf spring 17a (Fig. 9) whereof one end is pivotally fastened at 15a to the vertical web of said lever while its opposite end is supported by a flanged roller 18a loosely mounted on a transverse rod 19a fixed at its opposite ends to the opposite sides of the frame of the machine. An adjustable screw 20a carried by the lever bears against the intermediate portion of each spring 17a and this screw provides for adjustment of the pressure of the spring.

Upward movement of the gear sector lever arm 96 (Fig. 8) under the influence of either or both springs 17a is limited by a stop lug 165 provided on the frame of the machine and it will be clear that this stop also serves to limit the upward movements of levers 8a and abutment members 88.

It will be observed that rotative displacement of pinion 39a (Fig. 8) occasioned by vertical movement of rack 100 will be exactly proportional to said vertical movement; that the vertical displacement of rack 97 occasioned by angular movement of gear sector arm 96 will be exactly proportional to said angular movement, and that the amplified angular displacement of each gear sector abutment member 88 occasioned by angular movement downwardly of its lever 8a will be exactly proportional to said angular movement.

Normally a light spring 106 fastened at its upper end to lever arm 96 (Fig. 8) yieldingly urges said arm downwardly and acts through said arm and rock-shaft 89 to yieldingly urge the follower 93 toward and against the shoulders 94 of the abutment members 88. This spring 106, however, is of less effective strength than either leaf spring 17a so that throughout the calipering operation the lever 8a that is depressed the least by the blank will act through the connections described to control the position of lever arm 96, and therefore the position of the pointer of the indicator also, thus grading the blank according to the thickness of the thinnest spot of the calipered portion thereof. The connections referred to include what is in fact a knuckle joint connecting each abutment member 88 with the rock-shaft 89. A common example of a knuckle joint is found in the ordinary carpenter's folding rule.

The distance between the arcuate rack of teeth of each lever 8a and the axis of fulcrum shaft 10a is substantially greater than the distance between the axis of roll 2a and the axis of fulcrum shaft 10a and therefore angular displacement of lever 8a effected by the blank occasions a proportional but amplified angular displacement of its abutment member 88. Also, because of the difference between the radiuses of each gear sector abutment member 88 and gear sector arm 96 further motion amplifying effects are secured by the latter.

The roll-carrying levers 8a can be adjusted toward and from each other on fulcrum shaft 18a and set in positions appropriate to the width of the narrowest part of the blank being graded, said levers being set so that their rolls 2a will traverse the opposite side marginal portions of each blank and remain in engagement with the latter throughout the length thereof. The racks of gear teeth on abutment members 88 are made sufficiently wide to permit of adjustment of levers 8a as described without disengagement of their racks from the racks of said abutment members.

It is true of both forms of my invention that upon completion of each calipering or measuring operation the pointer-carrying shafts 40 are locked in grade-indicating positions and shortly thereafter the rear end of the blank is discharged from between the calipering rolls.

When this occurs during the operation of the first form above described the pin and slot connection illustrated in Fig. 4, permits the lever arms 8 to be moved toward their normal elevated positions by their springs 17 independently of the gear sector lever arm 26 (Fig. 1) and in opposition to the pull of spring 24.

Figure 8:
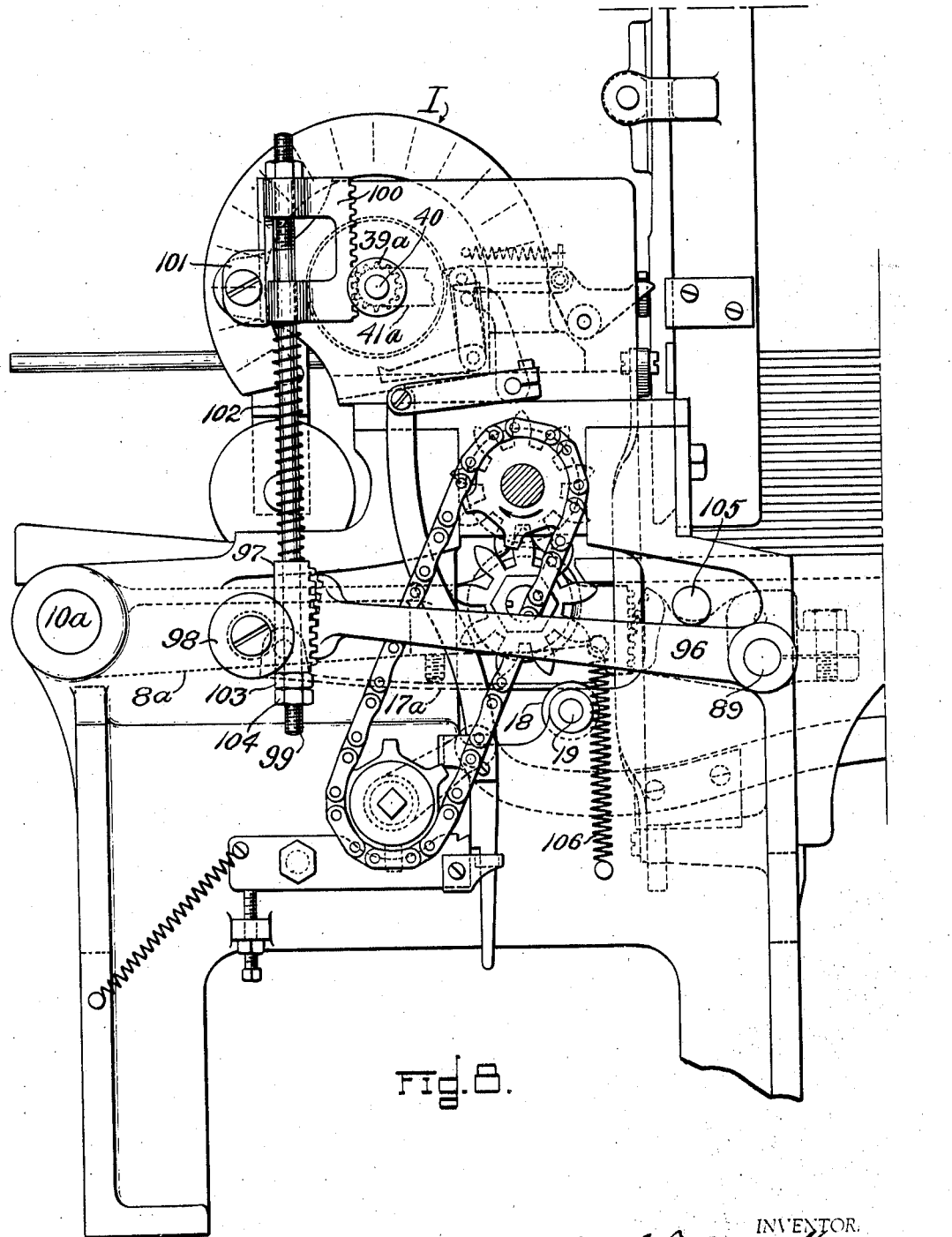
Figure 8 is a side elevation of a grading machine embodying another form of my invention.

In the case of the second form of the invention described above, the lever arms 8a are at such time returned to their normal elevated positions with arm 96 against stop 105 by their springs 17a which are strong enough to overcome the resistance of the relatively light spring 102 (Fig. 8).

What I claim is:

1. In a machine of the class described, blank calipering mechanism including a pair of rolls between which the blanks are fed one at a time by said rolls; adjustable grading mechanism; a rockshaft; a spring yieldingly urging said rockshaft rotatively in one direction; one-way knuckle joint means through which rotative adjustment of said rockshaft by said spring is occasioned and controlled by said calipering mechanism while the latter is in action so that the final setting of said rockshaft is proportionate to the thickness of the thinnest spot of the blank as detected by said calipering rolls; and motion transmitting and amplifying mechanism through which said rockshaft acts to adjust and set said grading mechanism.

2. In a machine of the class described, blank calipering mechanism including a pair of rolls between which the blanks are fed one at a time by said rolls; adjustable grading mechanism; a rockshaft; a spring yieldingly urging said rockshaft rotatively in one direction; one-way knuckle joint means through which rotative adjustment of said rockshaft by said spring is occasioned and controlled by said calipering mechanism while the latter is in action so that the final setting of said rockshaft is proportionate to the thickness of the thinnest spot of the blank as detected by said calipering rolls; a motion transmitting and amplifying train of gearing through which said rockshaft acts to adjust said grading mechanism; one-way abutment means through which said shaft actuates said train of gearing to adjust said grading mechanism when rocked in one direction by said spring; and a second spring directly connecting said rockshaft with one end of said train of gearing for permitting rocking movement of said rockshaft in the opposite direction by said calipering mechanism independently of said train of gearing and in opposition to said first-mentioned spring, while said grading mechanism is locked in adjusted condition.

3. In a machine of the class described, blank calipering mechanism including a pair of roll-carrying members each of which is yieldingly supported for calipering movement independently of the other; adjustable grading mechanism; a rockshaft; a spring yieldingly urging said rockshaft rotatively in one direction; one-way knuckle joint means through which rotative adjustment of said rockshaft by said spring is occasioned and controlled by said members while the latter are in action so that the final setting of said rockshaft is proportionate to the thickness of the thinnest spot of the blank as detected by one of said members; and motion transmitting and amplifying mechanism through which said shaft acts to adjust and set said grading mechanism.

4. In a machine of the class described, blank calipering mechanism including a pair of roll-carrying levers each of which is yieldingly supported at its free end for calipering movement independently of the other; adjustable grading mechanism; a rockshaft; a spring yieldingly urging said rockshaft rotatively in one direction; one-way knuckle joint means through which rotative adjustment of said rockshaft by said spring is occasioned and controlled by said levers while the latter are in action, and motion transmitting and amplifying mechanism through which said shaft acts, under the influence of said spring and under the control of one of said levers imposed upon said shaft through said knuckle joint means, to adjust said grading mechanism so that the final setting thereof is proportionate to the thickness of the thinnest spot of the blank as detected by said lever.

5. In a machine of the class described, blank calipering mechanism including a pair of roll-carrying levers that are pivotally supported for bodily adjustment toward and from each other so that they can be set in spaced apart relationship appropriate to the width of the blank being graded and each of which is also yieldingly supported at its free end for calipering movement independently of the other; adjustable grading mechanism; a rockshaft; a spring yieldingly urging said rockshaft rotatively in one direction; one-way knuckle joint means through which rotative adjustment of said rockshaft by said spring is occasioned and controlled by said levers while the latter are in action, and motion transmitting and amplifying mechanism through which said shaft acts, under the influence of said spring and under the control of one of said levers imposed upon said shaft through said knuckle joint means, to adjust said grading mechanism so that the final setting thereof is proportionate to the thickness of the thinnest spot of the blank as detected by said lever.

6. In a machine of the class described, blank calipering mechanism including a pair of roll-carrying levers each of which is yieldingly supported at its free end for calipering movement independently of the other; adjustable grading mechanism; a rockshaft; a spring yieldingly urging said rockshaft rotatively in one direction; one-way knuckle joint means through which rotative adjustment of said rockshaft by said spring is occasioned and controlled by said levers while the latter are in action, and motion transmitting and amplifying mechanism through which said shaft acts to adjust said grading mechanism, said transmitting and amplifying mechanism including as an element thereof a stiff spring operable to yieldingly permit movement of said rockshaft by said calipering mechanism independently of said grading mechanism after completion of the calipering operation and while said grading mechanism is locked in adjusted condition.

7. In a machine of the class described, blank calipering mechanism including a pair of roll-carrying levers each of which is yieldingly supported at its free end for calipering movement independently of the other; adjustable grading mechanism; a rockshaft; a spring yieldingly urging said rockshaft rotatively in one direction; one-way knuckle joint means through which rotative adjustment of said rockshaft by said spring is occasioned and controlled by said levers while the latter are in action; a train of motion transmitting and amplifying elements through which said shaft acts to adjust said grading mechanism, and means through which said rockshaft is connected with one end of said train so as to provide for return of said rockshaft to its normal position and also for return of said levers to their normal positions independently of said train when the blank is discharged from the calipering mechanism and while the grading mechanism is locked in its adjusted condition.

8. In a machine of the class described, the combination of claim 7 and wherein the said levers are bodily adjustable on said rockshaft toward and from each other so that they can be set in spaced apart relationship appropriate to the width of the blank being graded.

9. In a grading machine, a rockshaft provided with a pair of abutments that are movable angularly therewith; a pair of relatively independent calipering levers co-operatively associated with said abutments so as to occasion and control rotative adjustment of said rockshaft while they are in action measuring a blank; detecting elements carried by the free ends of said levers and adapted to traverse the opposite side marginal portions of the blank, respectively; means yieldingly supporting the free ends of said levers; grading mechanism, and motion transmitting mechanism through which rotative adjustment of said shaft acts to adjust said grading mechanism.

10. In a grading machine, the construction set forth in claim 9 and wherein said levers are pivotally supported to swing on the axis of said shaft.

11. In a grading machine, the construction set forth in claim 9 and wherein said levers are pivotally supported by said rockshaft.

12. In a grading machine, a rockshaft provided with abutment means that is movable angularly therewith; a pair of relatively independent calipering levers co-operatively associated with said abutment means so as to occasion and control rotative adjustment of said rockshaft while they are in action measuring a blank; detecting elements carried by said levers and adapted to traverse the opposite side marginal portions of the blank, respectively; means yieldingly supporting the free ends of said levers; grading mechanism, and means through which rotative adjustment of said shaft acts to adjust said grading mechanism.

ARTHUR G. B. METCALF.